United States Patent [19]

Tremblay

[11] Patent Number: 4,513,503
[45] Date of Patent: Apr. 30, 1985

[54] WIRE CUTTING TOOL

[75] Inventor: Paul Tremblay, Montreal, Canada

[73] Assignee: Tekna Limited, Montreal, Canada

[21] Appl. No.: 468,709

[22] Filed: Feb. 22, 1983

[51] Int. Cl.³ .............................................. B26B 29/00
[52] U.S. Cl. ...................................... 30/289; 30/290; 30/124; 339/95 R
[58] Field of Search ................ 30/289, 278, 280, 282, 30/283, 290, 296, 124, 134; 83/926 B; 339/95 R, 95 D, 103 M, 276 S, 276 SF; 29/278; 269/903

[56] References Cited

U.S. PATENT DOCUMENTS

| | | |
|---|---|---|
| 2,615,181 | 10/1952 | McGauphey . |
| 2,660,786 | 12/1953 | Loyd . |
| 2,863,214 | 12/1958 | Szappanyos . |
| 2,873,524 | 2/1959 | Freeman . |
| 2,985,958 | 5/1961 | Freeman . |
| 3,087,235 | 4/1963 | Porter ............................ 29/278 X |
| 3,310,872 | 3/1967 | Dowdell . |
| 3,588,081 | 6/1971 | Webster et al. ................. 269/903 X |
| 3,598,289 | 8/1971 | Norris . |
| 3,931,671 | 1/1976 | Dittman ......................... 269/903 X |
| 4,135,299 | 1/1979 | Moriarty . |

Primary Examiner—E. R. Kazenske
Assistant Examiner—Willmon Fridie, Jr.
Attorney, Agent, or Firm—Cushman, Darby & Cushman

[57] ABSTRACT

The present invention is concerned with a tool for cutting wires that have portions embedded in a connector block, the tool comprising an elongated hollow housing in which a plunger is reciprocatingly mounted; the housing includes an anvil at one end thereof which is so shaped as to receive thereon the connector block from which extends one or more wires to be cut; the extremity of the plunger has a wedge-shaped cutting end which may be forced into the connector in the area of a wire so as to effect a cutting of the wire leaving the cut extremity of the wire recessed with respect to the sidewall of the block.

14 Claims, 3 Drawing Figures

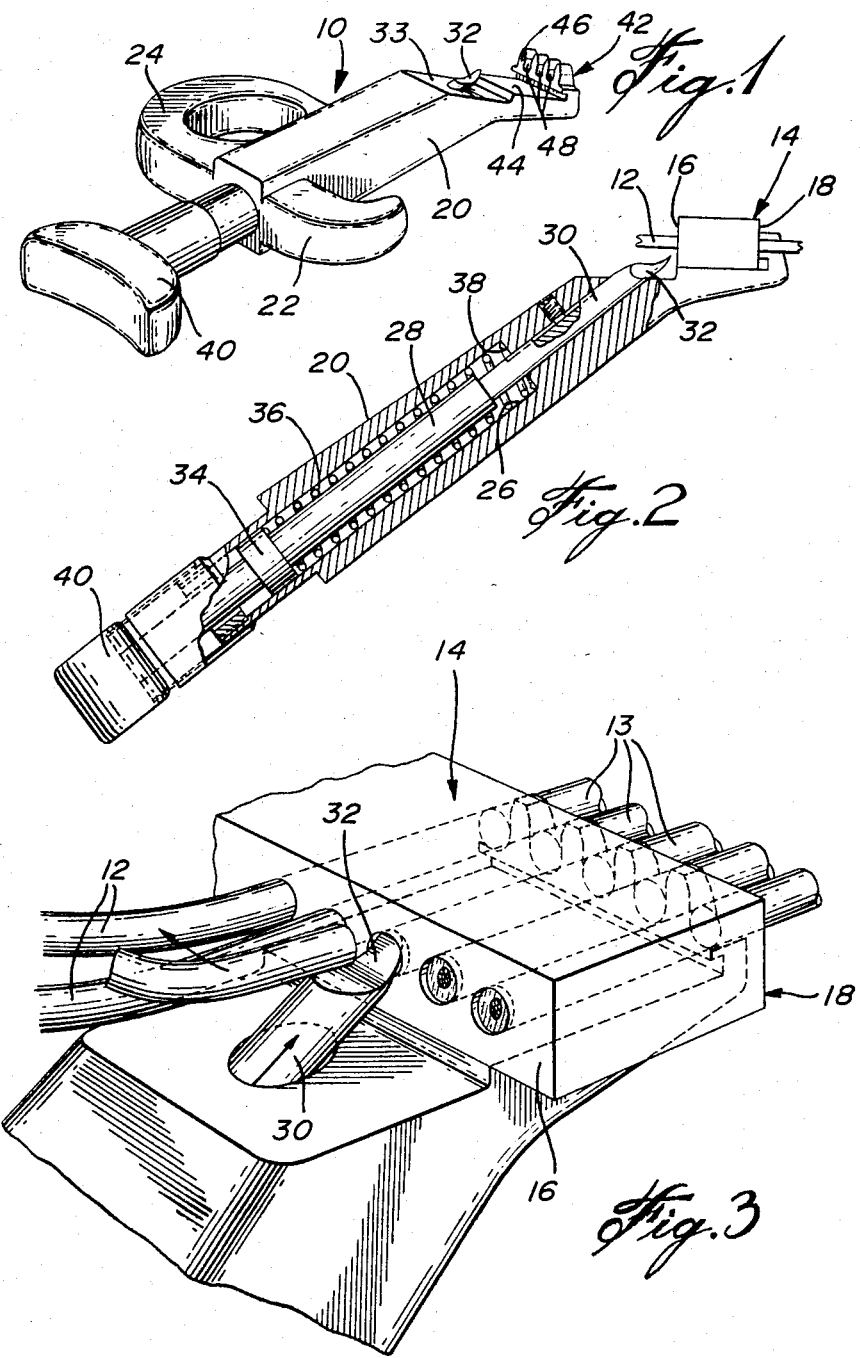

WIRE CUTTING TOOL

FIELD OF THE INVENTION

The present invention pertains to a tool for cutting wires which have portions embedded in a connector block and portions extending therefrom.

BACKGROUND OF THE INVENTION

In the field of electrical and electronic devices and equipment, wires are often encapsulated in a single moulded block so that to complete the manufacture or alteration of these devices and equipment, it is frequently required to cut one or more wires which protrude from such blocks to suit a particular circuit or need. Present methods consist in cutting the wires flush with the side face of the block. This has one disadvantage in that some electrically conducting wires are still exposed at the surface.

OBJECTS AND STATEMENT OF THE INVENTION

It is an object of the present invention to provide a tool which is capable of holding the connector block while cutting undesired wires protruding from the block in a manner that the cut extremity of the wires remaining in the block is inwardly recessed with respect to the sidewall from which extend these wires, thus greatly reducing the chances of accidently contacting the extremity of a possible live wire.

The present invention is achieved by providing a tool which comprises:

an elongated hollow housing;

a plunger reciprocatingly mounted in the housing, having a cutting end at one extremity thereof;

an anvil mounted at one end of the housing and including an inclined block-receiving portion making an angle with the longitudinal axis of the housing whereby a connector block may be received thereon with the wire-protruding face of the block in inclined facing relationship with the cutting end of the plunger; and means engaging the opposite extremity of the plunger for forcing the cutting end in the block at a wire-protruding location whereby the cutting end penetrates the block to cut the wire at a distance inwardly of its face so as to leave the cut extremity of the wire portion in the block, recessed from the face.

In one form of the invention, the anvil includes a block-resting surface and a block-abutting surface extending orthogonally to the resting surface, the latter opposing the force exerted on the block during a wire cutting operation.

The scope of applicability of the present invention will become apparent from the detailed description given hereinafter. It should be understood, however, that this description, while indicating preferred embodiments of the invention, is given by way of illustration only, since various changes and modifications within the spirit and scope of the invention will become apparent to those skilled in the art.

IN THE DRAWINGS

FIG. 1 is a perspective view of the cutting tool made in accordance with the present invention;

FIG. 2 is an elevation, partly cross-sectional, of the cutting tool; and

FIG. 3 is an enlarged perspective view showing the anvil portion of the tool.

DESCRIPTION OF A PREFERRED EMBODIMENT

Referring to the figures, there is shown a cutting tool, generally denoted 10, for cutting a series of wires 12 and 13 which have portions embedded in a connector block 14 and portions extending from opposite faces 16 and 18 of the block. The blocks referred to in the present invention are those made in a single moulding operation where the wires are encapsulated in the block; they differ from those blocks formed of parts which can be separated to alter or replace wires secured therein. The blocks of the present invention are usually made of plastics material.

The cutting tool 10 comprises an elongated hollow housing 20 which, in the embodiment illustrated, has a rectangular cross-section with two opposite sidewalls to which finger gripping elements 22 and 24 extend. Element 24 defines an annular body which may also serve to attach the tool to an operator's belt or similar equipment. Housing 20 includes a central bore 26 through which extends a plunger 28 having a cutting end portion 30 with a flattened wedge-shaped extremity 32. The length of the plunger is such that its cutting end portion 30 can be made to exit the inclined end face 33 of the housing. The plunger 28 has an enlarged annular portion 34 against which bears one end of a spring 36. The opposite end of the spring abuts the end wall 38 of a larger central portion of the bore. A hand pressing element 40 is mounted to the opposite end of the plunger and serves to actuate the plunger against the action of the spring 36 so as to protrude the cutting end 30 outside face 33 of the housing 20. The combined action of the operator's hand and of the spring causes the reciprocating movement of the plunger inside the housing.

An important feature of the present invention is the provision at one end of the housing 20 of an obliquely mounted anvil, generally denoted 42, which serves to receive the block 16 from which wires are to be cut. The anvil extends at an angle with respect to the longitudinal axis of the plunger so that the side face 16 of the connector block is set at an angle with respect to the plunger axis. The anvil 42 includes a flat block-resting surface 44 and an upstanding block-abutting wall 46 disposed at right angle to surface 44. In the embodiment illustrated, the upstanding wall 46 is formed with a series of grooves 48 which serve to allow passage of wires extending from the opposite face 18 of the block. This wall 46 which, in some cases may not require grooves, serves as an abutting wall for the block when pressure is applied against the block as described hereinbelow.

In operation, a connector block 14 is placed on surface 44 of the anvil with its rear surface 18 resting against wall 46. The index finger of the operator engages element 22 while the second finger engages element 24. The operator's thumb actuates element 40 against the action of spring 36 forcing the cutting end 30 of the plunger outside the housing towards face 16 of the block and at a location where a wire projects from the block. As shown in FIG. 3, the wedge-shaped flattened portion 32 of the plunger penetrates the block while also cutting progressively into the wire leaving the cut extremity of the wire inside the block a distance which is recessed with respect to the vertical plane of sidewall 16. Thus, the exposed surface of a cut wire is no longer flush with that plane. Preferably, the connector block 14 should be made of a deformable material, such as plastic, as mentioned above, so that the pointed 32 of the plunger may slightly penetrate the connector block adjacent the opening of a wire 12 prior to penetrating the wire.

It can easily be envisaged also that the provision of grooves on wall 46 for connectors having wires 13 projecting from face 18 assists in preventing lateral movement of the connector block during the wire connecting operation.

Although the invention has been described above in connection with one specific form, it will be evident to the man skilled in the art that it may be refined and modified in various ways. It should be understood, therefore, that the present invention should not be limited in interpretation except by the terms of the following claims.

The embodiments of the invention in which an exclusive property or privilege is claimed are defined as follows:

1. In combination, a connector block and a tool for cutting wires having portions embedded in the connector block and portions extending from at least one face of the connector block, said tool comprising:
   an elongated hollow housing;
   a plunger reciprocatingly mounted in said housing, said plunger having a cutting end at one extremity thereof;
   anvil means mounted at one end of said housing, said anvil means including an inclined block-receiving portion making an acute angle with the longitudinal axis of said housing and for receiving said connector block thereon with said face in inclined facing relationship with the cutting end of said plunger, said block-receiving portion having a block resting surface and a block abutting surface extending orthogonally to said block resting surface wherein said block abutting surface includes in the upper part thereof, a series of grooves to receive therein wires extending from an opposite face of said block; and
   means for engaging the opposite extremity of said plunger and for forcing said cutting end in said block at a wire extending location on said face so that said cutting end penetrates said block underneath said wire to cut said wire at a distance inwardly of said face so as to leave the cut extremity of said wire portion in said block, recessed from said face.

2. A combination as defined in claim 1, wherein said anvil is integrally mounted to said housing.

3. A combination as defined in claim 2, comprising spring means in said housing for retracting said plunger in said housing after a wire cutting operation.

4. A combination as defined in claim 1, wherein the cutting end of said plunger has a flattened wedge-shaped surface.

5. A combination as defined in claim 4, comprising spring means in said housing for retracting said plunger in said housing after a wire cutting operation.

6. A combination as defined in claim 1, comprising finger gripping means on said housing adjacent said engaging means.

7. A combination as defined in claim 1, comprising spring means in said housing for retracting said plunger in said housing after a wire cutting operation.

8. A tool for cutting wires comprising:
   an elongated housing having a first end;
   means defining a substantially flat surface at said first end of said housing, said flat surface making a acute angle with the longitudinal axis of said housing, and said surface integral with said housing;
   an upstanding wall formed at an end of said flat surface opposite said housing, said wall disposed in a plane perpendicular to said flat surface;
   a plunger reciprocally mounted in said housing for movement along said longitudinal axis, said plunger having a first, cutting, end thereof;
   means for engaging said plunger at a second end thereof, opposite said first end thereof, for moving said plunger between a first, non-cutting position wherein said cutting end of said plunger is spaced from an imaginary plane perpendicular to said flat surface and at the connection of said flat surface to said elongated housing, to a second position wherein said cutting end of said plunger extends past said imaginary plane, so that a portion of the cutting end of said plunger overlies said flat surface wherein said upstanding wall includes means defining a series of grooves therein, said grooves open at the portion of said wall remote from said flat surface.

9. A tool as recited in claim 8 wherein said cutting end of said plunger has a flattened wedge-shaped surface.

10. A tool as recited in claim 9 wherein said housing includes, adjacent a second end of said housing opposite said first end thereof, finger gripping means.

11. A tool as recited in claim 10 further comprising spring means in said housing for biasing said plunger to said first position thereof.

12. A tool as recited in claim 8 further comprising spring means in said housing for biasing said plunger to said first position thereof.

13. A tool as recited in claim 8 wherein said housing includes, adjacent a second end of said housing opposite said first end thereof, finger gripping means.

14. A tool as recited in claim 8 wherein said engaging means comprises a hand pressing element.

* * * * *